United States Patent
Chen et al.

(10) Patent No.: US 9,030,607 B2
(45) Date of Patent: May 12, 2015

(54) METHOD AND APPARATUS FOR RESTRAINNG ERRONEOUS IMAGE COLORS

(75) Inventors: Bing-Jhe Chen, Jhunan Township, Miaoli County (TW); Po-Wei Chao, Sindian (TW)

(73) Assignee: Realtek Semiconductor Corp., Hsinchu (TW)

( * ) Notice: Subject to any disclaimer, the term of this patent is extended or adjusted under 35 U.S.C. 154(b) by 2228 days.

(21) Appl. No.: 11/898,382

(22) Filed: Sep. 12, 2007

(65) Prior Publication Data

US 2008/0094503 A1    Apr. 24, 2008

(30) Foreign Application Priority Data

Oct. 18, 2006    (TW) .................... 95138436 A

(51) Int. Cl.
*H04N 9/78* (2006.01)
*H04N 1/60* (2006.01)

(52) U.S. Cl.
CPC ............. *H04N 9/78* (2013.01); *H04N 1/6005* (2013.01)

(58) Field of Classification Search
CPC .............................. H04N 1/6005; H04N 9/78
See application file for complete search history.

(56) References Cited

U.S. PATENT DOCUMENTS

| | | | |
|---|---|---|---|
| 5,305,120 A | 4/1994 | Faroudja | |
| 6,184,939 B1 * | 2/2001 | Wang et al. | 348/625 |
| RE38,661 E * | 11/2004 | Tachiuchi et al. | 345/89 |
| 7,227,587 B2 | 6/2007 | MacInnis et al. | |
| 7,551,232 B2 * | 6/2009 | Winger et al. | 348/607 |
| 7,697,075 B2 * | 4/2010 | Zhu | 348/609 |
| 7,742,110 B1 * | 6/2010 | Woodall | 348/665 |
| 2006/0007354 A1 * | 1/2006 | Chao | 348/450 |
| 2006/0017854 A1 | 1/2006 | Chao | |
| 2006/0092298 A1 * | 5/2006 | Ishiga | 348/272 |
| 2007/0030383 A1 * | 2/2007 | Law et al. | 348/448 |
| 2007/0139560 A1 * | 6/2007 | Zhong | 348/584 |

FOREIGN PATENT DOCUMENTS

| CN | 1774079 | 11/2004 |
|---|---|---|
| JP | 7274129 | 6/1995 |

OTHER PUBLICATIONS

English Abstract for JP 7274129.
English Abstract for CN 1774079.

* cited by examiner

*Primary Examiner* — Ricky Chin
(74) *Attorney, Agent, or Firm* — McClure, Qualey & Rodack, LLP

(57) ABSTRACT

A method and related apparatus for restraining erroneous image colors are provided for correcting pixel values of three sequential image fields of a video data while de-interlacing the video data. The method is utilized to correct the video data by detecting whether penetrations from luminance signals into chrominance signals or penetrations from chrominance signals into luminance signals occur in the video data. In embodiments of the present invention, the pixel chrominance signals of image fields with the same polarity are utilized to correct the pixel chrominance signals of another image field. Pattern matching and edge detection are utilized to determine whether penetrations from chrominance signals into luminance signals occur.

5 Claims, 8 Drawing Sheets

METHOD AND APPARATUS FOR RESTRAINNG ERRONEOUS IMAGE COLORS

FIELD OF THE INVENTION

The present invention relates to a method and related apparatus for restraining erroneous image colors, and more particularly to a method and related apparatus for restraining erroneous image colors during a process of de-interlacing video data.

BACKGROUND OF THE INVENTION

In general, a TV signal in NTSC standard or PAL standard is composed of a luminance signal and a chrominance signal, and the TV signal is generated by combining the luminance signal and the chrominance signal on a carrier signal. After receiving the TV signal, the luminance signal and the chrominance signal will be separated and recovered from the carrier signal so as to display video signal on a TV screen. However, if the separation of the luminance signal and the chrominance signal from the carrier signal is not processed completely, some of the luminance signal may penetrate into the chrominance signal, or some of the chrominance signal may penetrate into the luminance signal, which results in a false video color signal displayed on the TV screen. In addition, a back-end control processor performing controlling process based on the image information displayed on the TV screen will be likely to cause an error detecting result due to the false video color signal displayed on the TV screen, and which in turn will cause inaccurate process.

The output of a front-end circuit is usually transmitted based on image field style. Since a frame is composed of two image fields having different polarities, a frame can be recovered for displaying on the TV screen by the back-end circuit through a de-interlacing process. It is well known that the suppression of false video color signals is normally processed based on a frame or a plurality of image fields having different polarities, which consumes larger bandwidth provided by the system and requires extra buffer memories.

For that reason, the present invention provides a method and related apparatus for restraining erroneous image colors to solve the aforementioned problems.

SUMMARY OF THE INVENTION

It is one of objective of the present invention to provide a method and related apparatus for restraining erroneous image colors, and the method and apparatus are applied in a process of de-interlacing a video data to correct pixel values of image fields of the video data.

It is one of objective of the present invention to provide a method and related apparatus for restraining erroneous image chrominance, and the method and apparatus are applied in a process of de-interlacing a video data to correct pixel values of image fields of the video data.

It is one of objective of the present invention to provide a method and related apparatus for restraining erroneous image luminance, and the method and apparatus are provided for correcting a luminance signal of a target pixel of an image field.

Another objective of the present invention is to perform detection operations and correction operations for the image chrominance and the image luminance separately so as to simplify the required operative computation.

Another objective of the present invention is to perform the correction of the image chrominance by three image fields with different polarities only, so as to reduce the required buffer memories.

To make it easier for our examiner to understand the objective of the invention, its structure, innovative features, and performance, preferred embodiments together with the attached drawings for the detailed description of the invention are provided as the followings.

BRIEF DESCRIPTION OF THE DRAWINGS

The subject matter regarded as the invention is particularly pointed out and distinctly claimed in the concluding portion of the specification. The invention, both as to device and method of operation, together with features and advantages thereof may best be understood by reference to the following detailed description with the accompanying drawings in which:

DETAILED DESCRIPTION OF EMBODIMENTS

Hereinafter, embodiments of the present invention will be described in detail with reference to the accompanying drawings. Here, it is to be noted that the present invention is not limited thereto.

Figure 1:
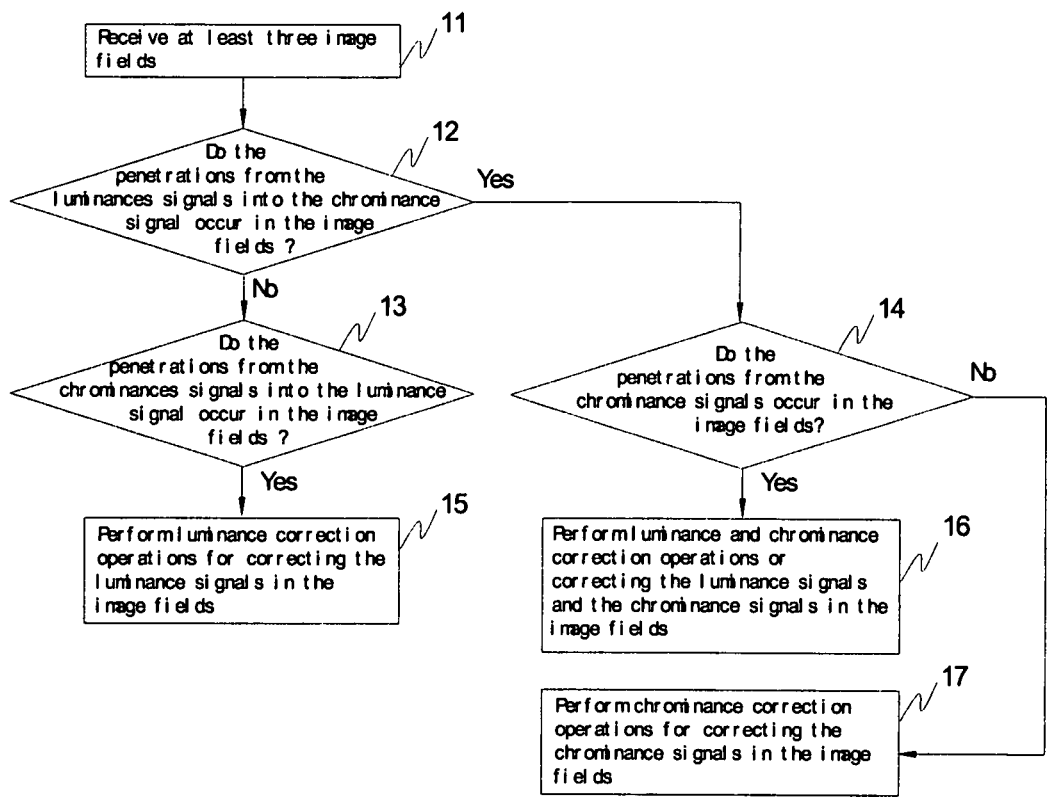
FIG. 1 is a flowchart depicting a method for restraining erroneous image colors in accordance with an embodiment of the present invention.

Referring to FIG. 1 for a flowchart depicting a method for restraining erroneous image colors in accordance with an embodiment of the present invention, the method is applied in a process of de-interlacing a video data for correcting the pixel values of three sequential image fields of the video data, and the method includes the following steps:

Step 11: receiving three sequential image fields;

Step 12: determining whether the penetrations from the luminance signals into the chrominance signals occur in the image fields; if no, go to Step 13, otherwise go to Step 14;

Step 13: determining whether the penetrations from the chrominance signals into the luminance signals occur in the image fields; if yes, go to Step 15;

Step 14: determining whether the penetrations from the chrominance signals into the luminance signals occur in the image fields; if yes, go to Step 16, otherwise go to Step 17;

Step 15: performing luminance correction operations for correcting the luminance signals in the image fields;

Step 16: performing luminance and chrominance correction operations for correcting the luminance signals and the chrominance signals in the image fields;

Step 17: performing chrominance correction operations for correcting the chrominance signals in the image fields.

Figure 2:
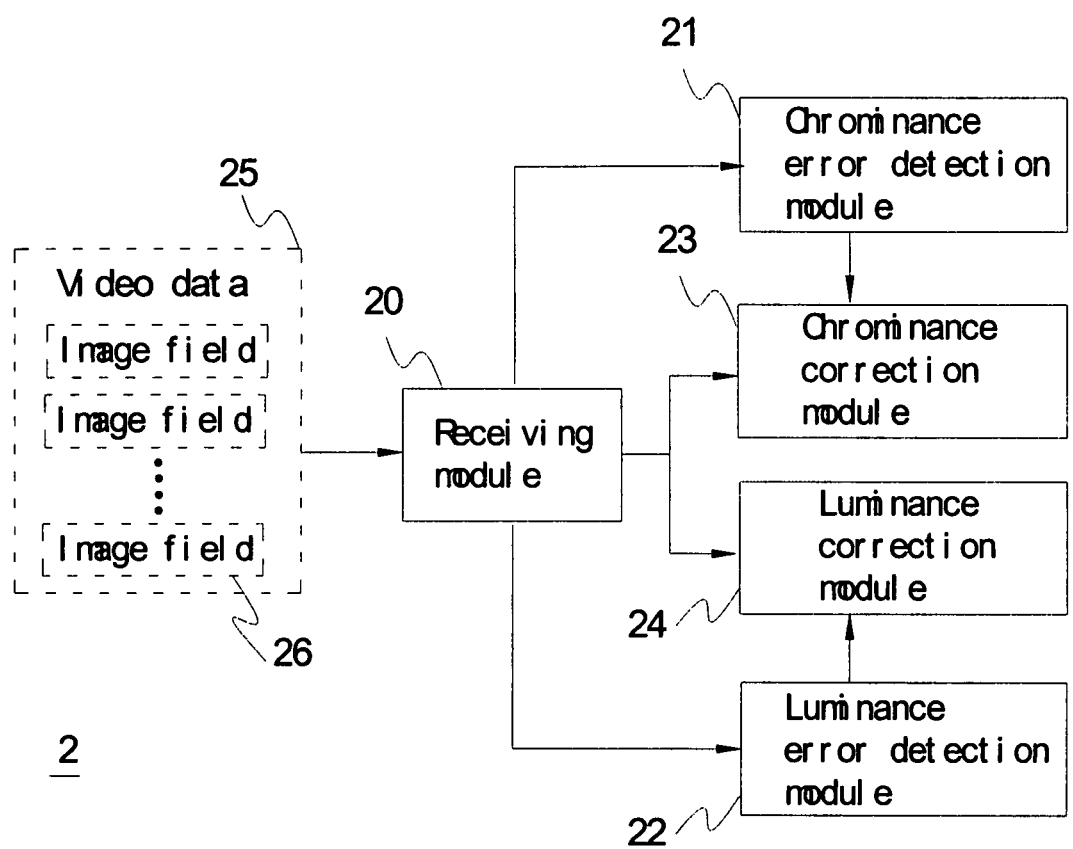
FIG. 2 is a schematic block diagram of an apparatus for restraining erroneous image colors in accordance with an embodiment of the present invention.

Referring to FIG. 2 for a schematic block diagram of an apparatus for restraining erroneous image colors in accordance with an embodiment of the present invention, the apparatus is applied for performing a process of de-interlacing a video data 25 to correct pixel values of three sequential image fields 26 of the video data. The apparatus 2 includes a receiving module 20, a chrominance error detection module 21, a luminance error detection module 22, a chrominance correction module 23 and a luminance correction module 24.

The receiving module 20 is provided for receiving the image fields, and for transmitting the image fields to the chrominance error detection module 21 and the luminance error detection module 22. The chrominance error detection module 21 is provided for determining whether the penetrations from the luminance signals into the chrominance signals occur in the image fields for generating a first decision signal 27. The first decision signal 27 is then transmitted to the chrominance correction module 23. If the first decision signal 27 indicates that the penetrations from the luminance signals into the chrominance signals occur in the image fields, the chrominance correction module 23 will perform chrominance correction operations for correcting the chrominance signals in the image fields 26.

The luminance error detection module 22 is provided for determining whether the penetrations from the chrominance signals into the luminance signals occur in the image fields for generating a second decision signal 28. The second decision signal 28 is then transmitted to the luminance correction module 24. If the second decision signal 28 indicates that the penetrations from the chrominance signals into the luminance signals do occur in the image fields, the luminance correction module 24 will perform luminance correction operations for correcting the luminance signals in the image fields 26.

Figure 3:
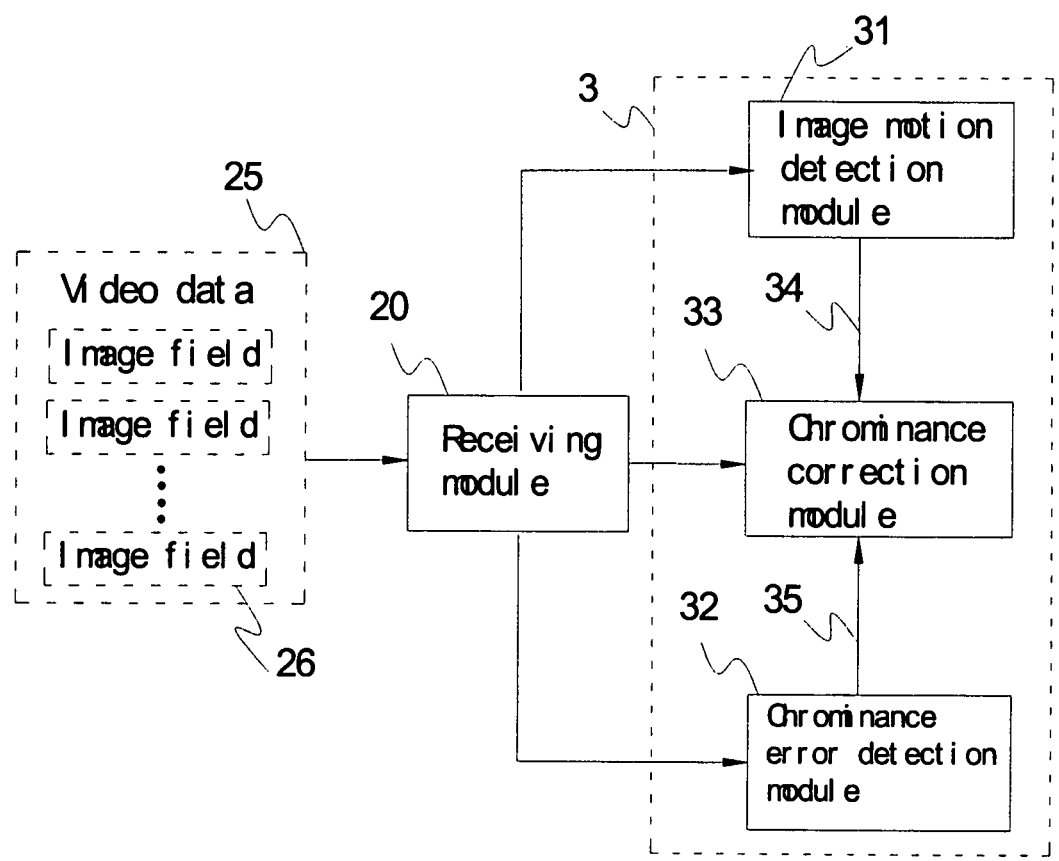
FIG. 3 is a schematic block diagram of an apparatus for restraining erroneous image chrominance in accordance with an embodiment of the present invention.

Please refer to FIG. 3. FIG. 3 illustrates a schematic block diagram of an apparatus 3 for restraining erroneous image chrominance according to an embodiment of the present invention. The apparatus 3 is utilized to correct chrominance signals of sequential three image fields 26 of a video data 25 while de-interlacing the video data 25. The apparatus 3 includes an image motion detection module 31, a chrominance error detection module 32, and a chrominance correction module 33.

The image motion detection module 31 is utilized to determine whether the plurality of image fields 26 are static for generating a third decision signal 34. The chrominance error detection module 32 is utilized to determine whether the penetrations from the luminance signals into the chrominance signals occur for generating a fourth decision signal 35.

Thereafter, the chrominance correction module 33 performs chrominance signal correction operations selectively for correcting the chrominance signals of the plurality of image fields 26 based on the third decision signal 34 and the fourth decision signal 35. The technique for determining whether the plurality of image fields 26 are static is well-known and, for the sake of brevity, further discussion is omitted.

The technique for determining whether the penetrations from the luminance signals into the chrominance signals occur can be achieved by detecting the variation of the chrominance values of a pixel at the same position of successive image fields 26. Please note that the operation of the image motion detection module 31 is able to make sure that the image fields processed subsequently by the chrominance correction module 33 are static, and the operation of the chrominance error detection module 32 is able to make sure that the image fields processed subsequently by the chrominance correction module 33 are suffering from the above-mentioned penetration phenomenon.

Taking NTSC system for example, if the penetrations from the luminance signal into the chrominance signal occur, a phase inverting technique is thereby applied. The luminance signal of a pixel during a consecutive time sequence of T, T+1, T+2, T+3, and T+4 can be shown to have a luminance signal sequence of Y+C, Y−C, Y−C, Y+C, and Y+C, wherein Y means original luminance of the pixel and C means original chrominance of the pixel.

Because the variation of the luminance and the chrominance of the pixels of the static sequential image fields is not quite significant, the pixels having penetrations from the luminance signals into the chrominance signals can be detected through calculating the variation of the chrominance signals within continuous time.

Figure 4:
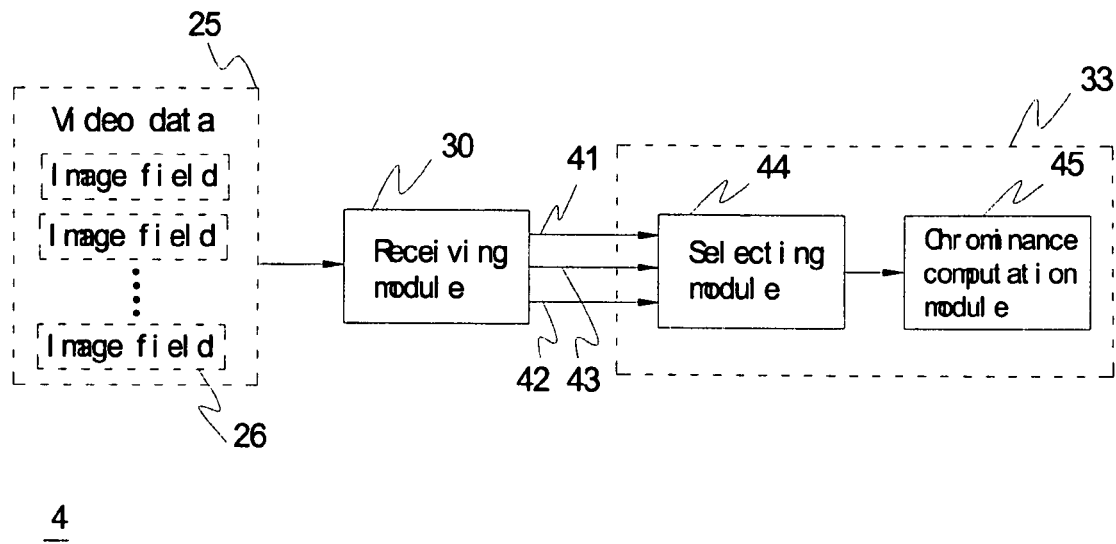
FIG. 4 is a schematic block diagram of a chrominance correction module in accordance with an embodiment of the present invention.

Referring to FIG. 4 for is a schematic block diagram of a chrominance correction module 33 as depicted in FIG. 3, the chrominance correction module 33 reads a first image field 41, a second image field 42 and a third image field 43 sequentially from a receiving module 30, and the polarity of the first image field 41 is the same as the polarity of the third image field 43.

The chrominance correction module 33 includes a selecting module 44 and a chrominance computation module 45. The selecting module 44 selects a first pixel group from the first image field 41 and a second pixel group from the third image field 43 according to the position of a target pixel of the second image field 42.

The chrominance computation module 45 computes a correcting value to correct the chrominance signal of a target pixel according to the chrominance signal of the first pixel group and the chrominance signal of the second pixel group. In addition, the chrominance computation module 45 corrects the chrominance signals of a portion of pixels of the first pixel group and the chrominance signals of a portion of pixels of the second pixel group according to the chrominance signals of the first pixel group and the chrominance signals of the second pixel group.

In this embodiment, the correcting value is an average of the chrominance signals of the pixels of the first pixel group and the second pixel group.

Figure 5:
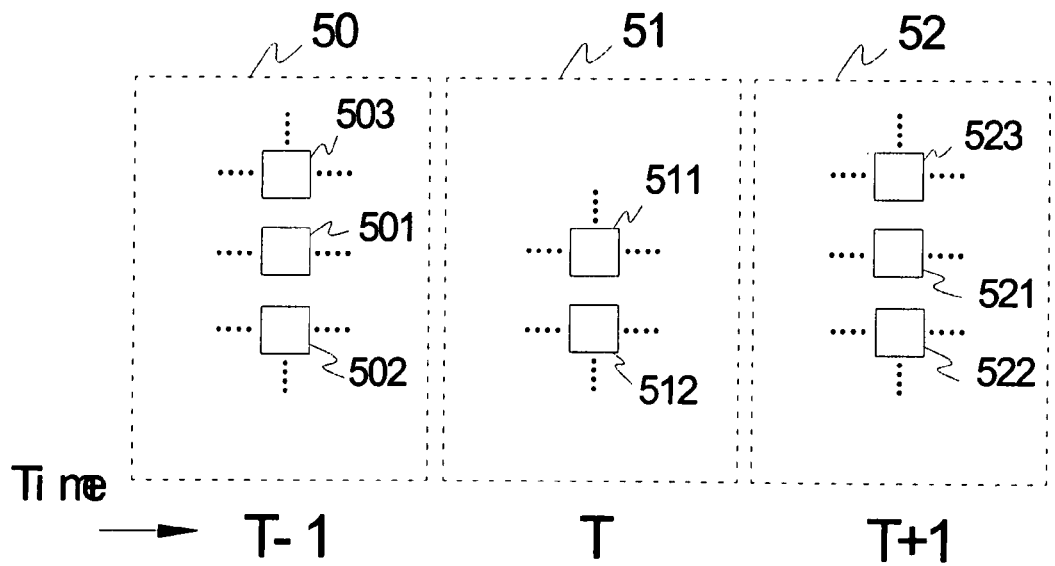
FIG. 5 is a schematic diagram illustrating a processing method of a chrominance correction module in accordance with an embodiment of the present invention.

Please refer to FIG. 5. FIG. 5 is a schematic diagram illustrating a processing method of a chrominance correction module 33 as depicted in FIG. 3 in accordance with an embodiment of the present invention. Please note that a NTSC system is adopted in this embodiment.

As is shown in FIG. 5, there are three sequential image fields, which are an image field 50, an image field 51 and an image field 52, corresponding to the time T−1, T and T+1 respectively. The polarity of the image field 50 is the same as the polarity of the image field 52. However, in consideration of phase relationship, the phase of the image field 50 is opposite to the phase of the image field 52, and the phase of the image field 51 is not necessarily the same as or opposite to the phase of the image field 50 or the image field 52.

The pixels 501, 511 and 521 are situated at the pixel position of (m, n) of the image fields 50, 51 and 52 respectively. The pixels 502, 512 and 522 are situated at the pixel position (m, n+1) of the image fields 50, 51, 52 respectively. The pixels 503 and 523 are situated at the pixel position (m, n−1) of the image fields 50 and 52 respectively. If the pixel 511 is detected to have penetration from the luminance signal into the chrominance signal, then the pixels 501 and 503 can be selected as a first pixel group, and the pixels 521 and 523 can be selected as a second pixel group, and the chrominance signals C501, C503, C521 and C523 of these pixels can be utilized for performing correction operations. The chrominance value C511_restrained of the chrominance signal of the corrected pixel 511 is given as follows:

$$C511\_restrained = (C501 + C503 + C521 + C523)/4$$

Similarly, if the pixel 512 is detected to have penetration from the luminance signal into the chrominance signal, then the chrominance value C512_restrained of the chrominance signal of the corrected pixel 512 is given as follows:

$$C512\_restrained = ((C502 + C501) + (C522 + C521))/4$$

In addition, the chrominance values of the pixels 501, 521, 502 and 522 can be used for computing the correcting chrominance values C501_restrained, C521_restrained, C502_restrained and C522_restrained by the following equations:

$$C501\_restrained = (C501 + C521)/2$$

$$C521\_restrained = (C501 + C521)/2$$

$$C502\_restrained = (C502 + C522)/2$$

$$C522\_restrained = (C502 + C522)/2$$

Based on the foregoing process of using two image fields having the same polarity to produce a third image field, the purpose of correcting the chrominance signals of pixels based on only three image fields can be achieved.

Figure 6:
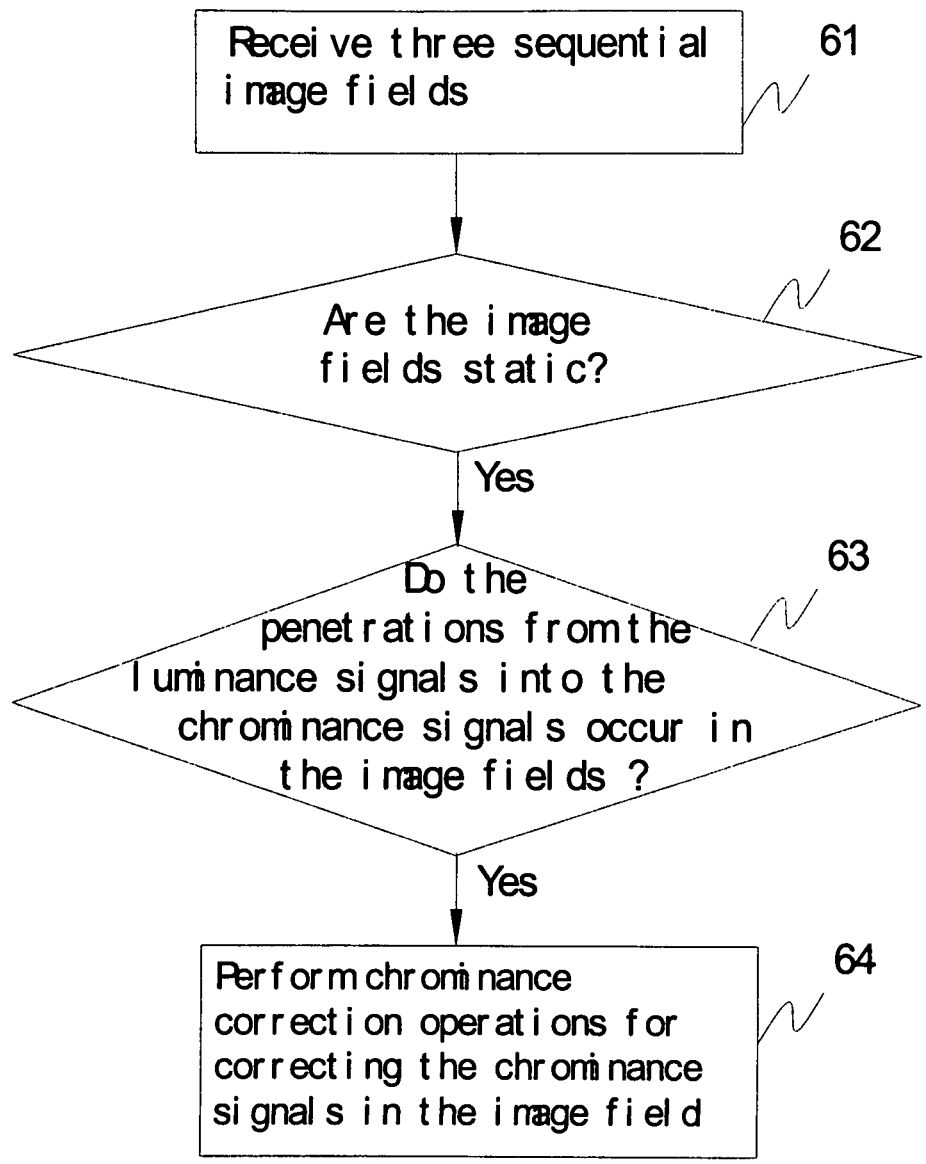
FIG. 6 is a flowchart depicting a method for restraining erroneous image chrominance in accordance with an embodiment of the present invention.

Referring to FIG. 6 for a flowchart depicting a method for detecting and restraining erroneous image chrominance in accordance with an embodiment of the present invention, the method is applied in a process of de-interlacing a video data to correct three sequential image fields of a chrominance signal of the video data, and the method comprises the following steps:

Step 61: receiving three sequential image fields;

Step 62: determining whether these image fields are static image fields; if yes, go to Step 63;

Step 63: determining whether the penetrations from the luminance signals into the chrominance signals occur in the image fields; if yes, go to Step 64; and Step 64: performing chrominance correction operations for correcting the chrominance signals in the image fields.

Figure 7:
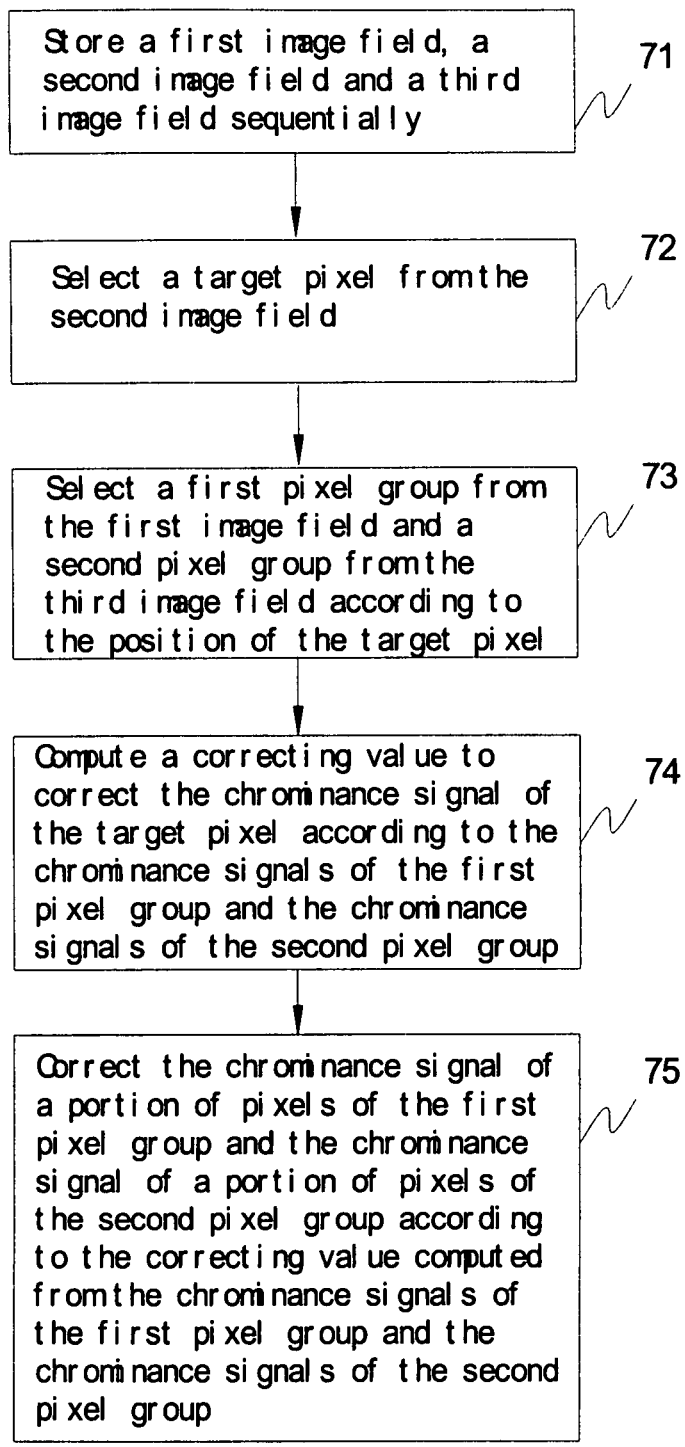
FIG. 7 is a flowchart depicting a chrominance correction method in accordance with an embodiment of the present invention.

Referring to FIG. 7 for a flowchart depicting a chrominance correction method corresponding to the aforementioned step 64 in accordance with an embodiment of the present invention, the method includes the following steps:

Step 71: storing a first image field, a second image field and a third image field sequentially, wherein these image fields are adjacent to each other and the first image field has the same polarity and opposite phase respective to the third image field;

Step 72: selecting a target pixel from the second image field;

Step 73: selecting a first pixel group from a first image field and a second pixel group from a third image field according to the position of the target pixel;

Step 74: computing a correcting value to correct the chrominance signal of the target pixel according to the chrominance signals of the first pixel group and the chrominance signals of the second pixel group; and Step 75: correcting the chrominance signals of a portion of pixels of the first pixel group and the chrominance signals of a portion of pixels of the second pixel group according to the correcting value computed from the chrominance signals of the first pixel group and the chrominance signals of the second pixel group.

By performing the procedure from Step 72 to Step 75 repeatedly, the chrominance signals of the first image field, second image field and third image field can be corrected.

Figure 8:
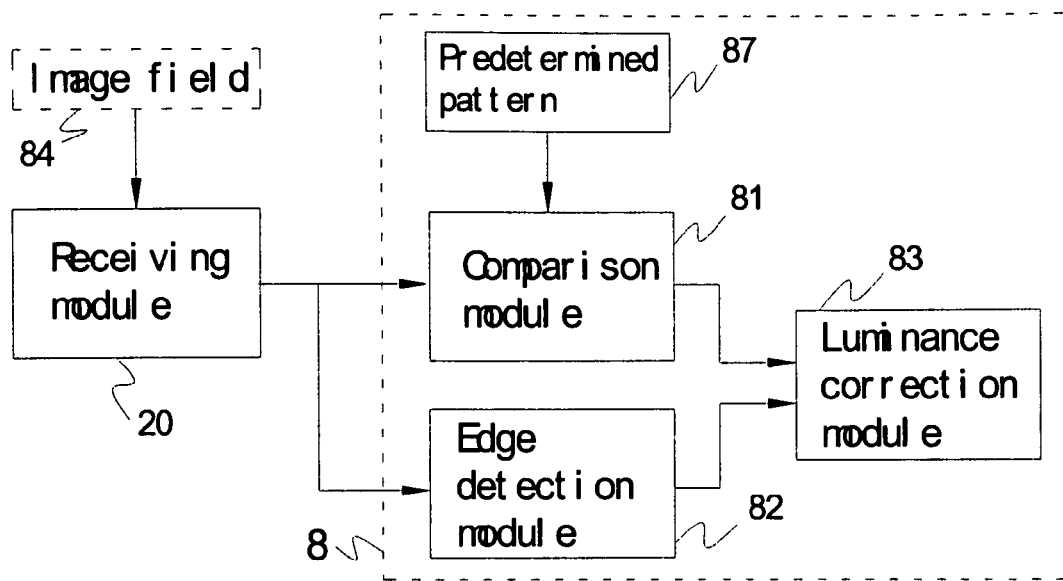
FIG. 8 is a schematic block diagram of an apparatus for restraining erroneous image luminance in accordance with an embodiment of the present invention.

Referring to FIG. 8 for a schematic block diagram of an apparatus for restraining erroneous image luminance in accordance with an embodiment of the present invention, the apparatus 8 includes a comparison module 81, an edge detection module 82 and a luminance correction module 83.

The receiving module 20 is provided for receiving an image field 84 and transmitting the image field 84 to the comparison module 81 and the edge detection module 82. The comparison module 81 selects a pixel area including a target pixel from the image field 84, and compares the luminance signals of a plurality of pixels in the pixel area with a predetermined pattern 87.

The edge detection module 82 is provided for determining whether the target pixel is on edge. If the luminance signals of a plurality of pixels in the pixel area match the predetermined pattern 87 and the target pixel is not on edge, the luminance correction module 83 will correct the luminance signals of a plurality of pixels in the pixel area according to a low-pass filtering algorithm. The technique of determining whether the target pixel is on edge and the technique of the low-pass filtering algorithm are well-known, and for the sake of brevity, further discussion is omitted.

Figure 9:
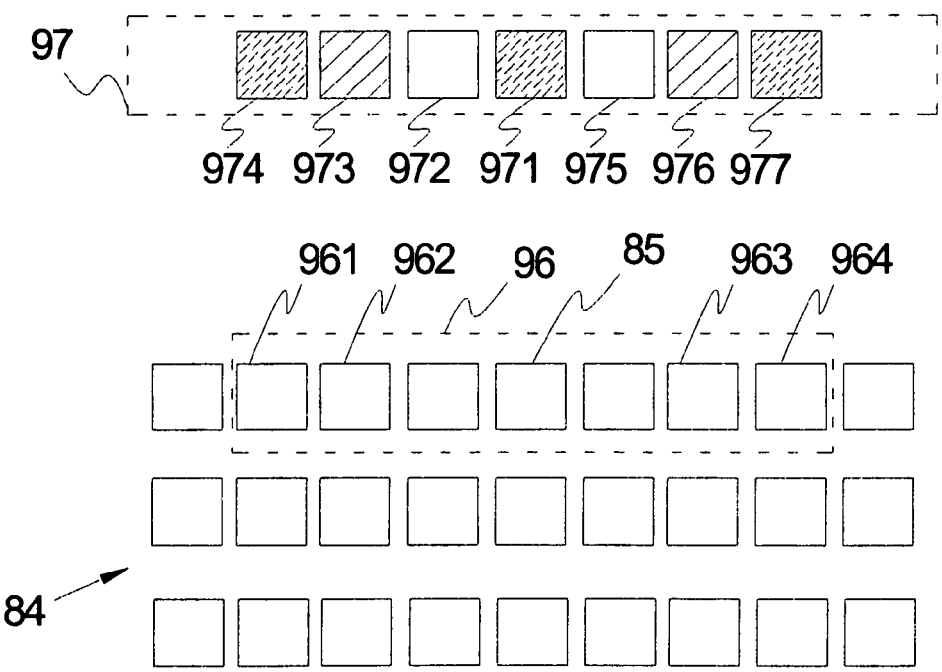
FIG. 9 is a schematic diagram showing a predetermined pattern in accordance with an embodiment of the present invention.

Referring to FIG. 9, the predetermined pattern 97 in FIG. 9 is used for comparing the luminance at five positions to determine whether phenomenon of penetration from chrominance signal into luminance signal occurs at the position 971. The position 971 corresponds to the position of a target pixel 85, and the positions 974 and 977 are the positions with locations having two pixels apart from the position 971. The luminance values of the positions 974 and 977 are the same and equal to 100% of the luminance value of the position 971 in percentage. The positions 973 and 976 are the positions with locations having one pixel apart from the position 971. The luminance values of the positions 973 and 976 are the same and equal to 70% of the luminance value of the position 971 in percentage.

If the comparison module 81 uses the predetermined pattern 97 for the comparison, the pixel area 96 will be selected. The pixel area 96 includes the target pixel 85 and six adjacent pixels on the same row with the target pixel 85, and the luminance signals of seven pixels in the pixel area 96 are compared with the predetermined pattern 97. If the luminance values of pixels 961 and 964 are close to the luminance value of the target pixel 85, and the luminance values of pixels 962 and 963 are close to 70% of the luminance value of the target pixel 85, the target pixel 85 will be determined as having penetration from the luminance signal into the chrominance signal. A threshold can be set for determining whether two luminance values are close or equal. If the difference of two luminance values is smaller than the threshold, the two luminance values can be considered as close or equal to each other.

The predetermined pattern adopted in the foregoing embodiment is used for illustrations only, and the scope of the present invention is not limited to such arrangement.

Figure 10:
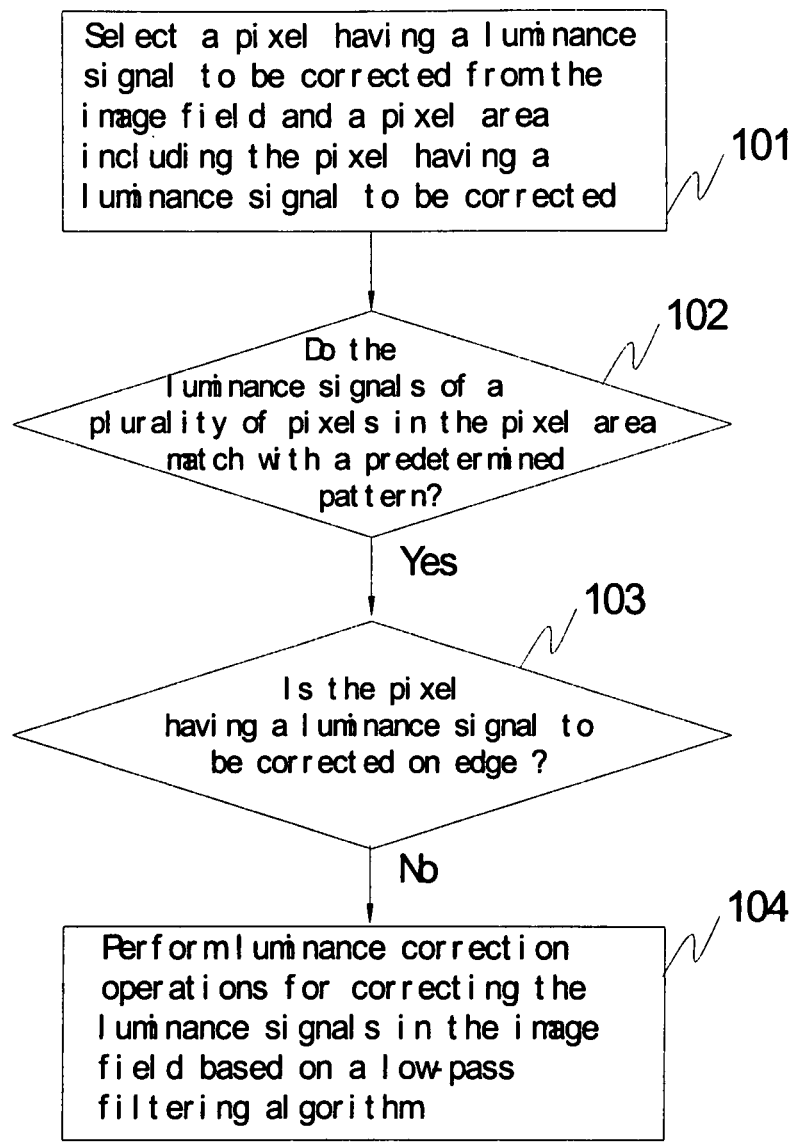
FIG. 10 is a flowchart depicting a method for restraining erroneous image luminance in accordance with an embodiment of the present invention.

Referring to FIG. 10 for a flowchart depicting a method for restraining erroneous image luminance in accordance with an embodiment of the present invention, the method includes the following steps:

Step 101: selecting a pixel having a luminance signal to be corrected from the image field and a pixel area including the pixel having a luminance signal to be corrected;

Step 102: determining whether the luminance signals of a plurality of pixels in the pixel area match with a predetermined pattern; if yes, go to Step 103;

Step 103: determining whether the pixel having a luminance signal to be corrected is on edge; if no, go to Step 104; and Step 104: performing luminance correction operations for correcting the luminance signals of the pixels in this pixel area based on a low-pass filtering algorithm.

By performing the procedure from Step 101 to Step 104 repeatedly, the luminance signals of an image field can be corrected.

It is noteworthy to point out that the algorithm adopted by the foregoing embodiments for correcting the chrominance signal and the luminance signal is used only for illustration, and the scope of the invention is not limited to this method. While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for restraining erroneous image luminance to correct a luminance signal of a target pixel of an image field, and said method comprising:
   selecting a pixel area including said target pixel from said image field;
   comparing luminance signals of pixels in said pixel area with a predetermined pattern;
   determining whether said target pixel is on edge if said luminance signals of said pixels of said pixel area match said predetermined pattern; and
   correcting said luminance signals of said pixels of said pixel area according to a low-pass filtering algorithm if responsive to said luminance signals of said pixels of said pixel area matching said predetermined pattern and said target pixel is not on edge,
   wherein said pixel area comprises said target pixel and a plurality of adjacent pixels of a same row of said target pixel, wherein correcting further comprises:
   comparing the luminance signals of said target pixel and said adjacent pixels with respective pixels of said predetermined pattern;
   determining there is said match based on a defined threshold closeness in luminance values of the luminance signals of said target pixel and said adjacent pixels to luminance values of said respective pixels of said predetermined pattern,
   wherein a defined threshold closeness for a first set of pixels of the pixel comparisons is different than a defined threshold closeness for a second set of pixels of the pixel comparisons.

2. The method of claim 1, wherein said pixel area comprises said target pixel and one or more surrounding pixels, wherein comparing the luminance signals of pixels in said pixel area with said predetermined pattern further comprises comparing the luminance signals of said target pixel and said one or more surrounding pixels with respective pixels of said predetermined pattern.

3. The method of claim 2, wherein determining further comprises determining there is said match based on a defined threshold closeness in luminance values of the luminance signals of said target pixel and said one or more surrounding pixels to luminance values of said respective pixels of said predetermined pattern.

4. The method of claim 3, wherein a defined threshold closeness for a first set of pixels of the pixel comparisons is different than a defined threshold closeness for a second set of pixels of the pixel comparisons.

5. An apparatus for restraining erroneous image luminance to correct a luminance signal of a target pixel of an image field, comprising:
   a receiving module with circuitry for receiving said image field;
   a pattern matching module with circuitry for selecting a pixel area including said target pixel from said image field, and comparing luminance signals of pixels of said pixel area with a predetermined pattern;
   an edge detection module with circuitry for determining whether said target pixel is on edge based on said comparison; and
   a luminance correction module with circuitry for correcting said luminance signals of said pixels of said pixel area according to a low-pass filtering algorithm if responsive to said luminance signals of said pixels of said pixel area matching said predetermined pattern and said target pixel is not on edge,
   wherein said pixel area comprises said target pixel and a plurality of adjacent pixels of a same row of said target pixel, wherein the luminance correction module is further configured to:
   compare the luminance signals of said target pixel and said adjacent pixels with respective pixels of said predetermined pattern;
   determine there is said match based on a defined threshold closeness in luminance values of the luminance signals of said target pixel and said adjacent pixels to luminance values of said respective pixels of said predetermined pattern,
   wherein a defined threshold closeness for a first set of pixels of the pixel comparisons is different than a defined threshold closeness for a second set of pixels of the pixel comparisons.

* * * * *